Nov. 6, 1951 H. A. ROSEN 2,574,064
EDUCATIONAL APPLIANCE
Filed Aug. 30, 1948 3 Sheets-Sheet 1

INVENTOR
Harry A. Rosen
BY
ATTORNEY

Nov. 6, 1951 H. A. ROSEN 2,574,064
EDUCATIONAL APPLIANCE
Filed Aug. 30, 1948 3 Sheets-Sheet 2

INVENTOR
Harry A. Rosen
BY
ATTORNEY

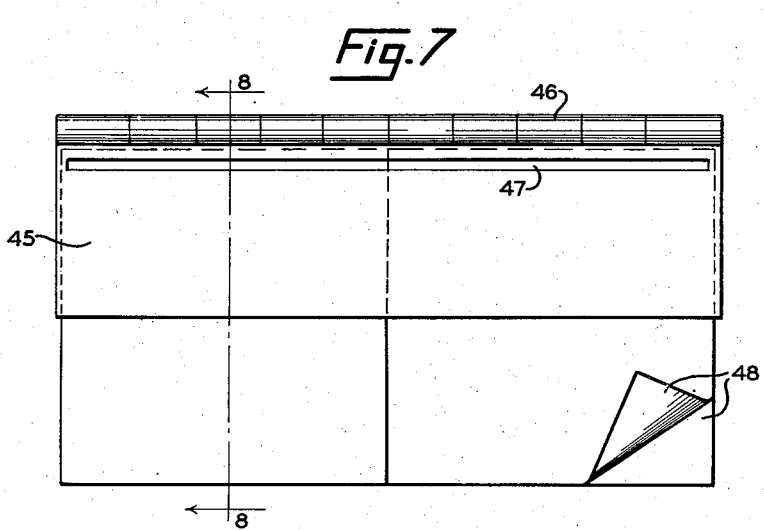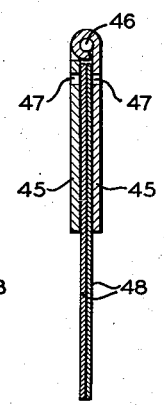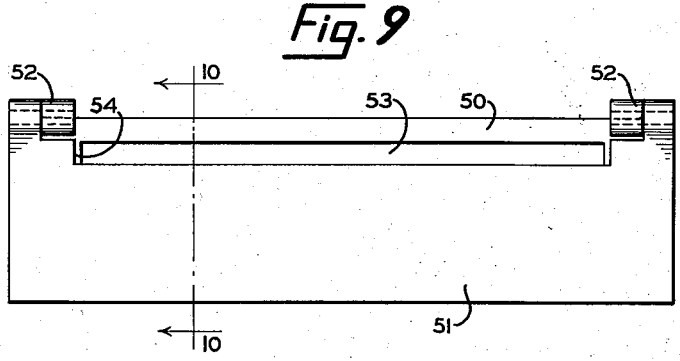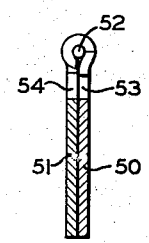

Patented Nov. 6, 1951

2,574,064

UNITED STATES PATENT OFFICE 2,574,064

EDUCATIONAL APPLIANCE

Harry A. Rosen, New York, N. Y.

Application August 30, 1948, Serial No. 46,889

3 Claims. (Cl. 35—15)

The present invention relates to educational appliances and more particularly to an educational device for use in teaching a person to sew.

It has for an object to provide a novel and useful device for use in the teaching of sewing to the uninitiated, such as young children which will give them skill in sewing while removing much of the danger of harm from manipulations of a sewing needle.

A further object of the invention is the provision of an educational toy or like appliance for teaching sewing in straight lines in a novel manner and with respect to a great number of different shapes and forms, whereby to give variety to the toy and enhance its educational function.

Generally, the invention contemplates a sewing device having two parts in which one or more slots are provided of predetermined contour and size to act as guides for a needle during sewing of material placed between the associated parts of said device with said slots aligned in register.

More specifically, in one embodiment of the invention the sewing device includes two members with slots therein slightly wider than the largest portion of the sewing needle chosen for use therewith, the guide being formed of the two parts between which fabric or like material to be sewed upon is placed. The guides are affixed to one another with the material therebetween in any desired way. For example, a hinge may attach the guides together and for locking them after insertion of the material therebetween to hold them firmly in relative position there may be provided a simple clip.

The guides may comprise flat strips or plates of material such as a transparent plastic, in which slots are cut in register with each other when the guides are in closed superposed position for acting as a sewing aid.

These slots may be formed as straight lines and may, if desired, substantially delineate the shape of a form, such as doll's pajama trousers, a blouse or the like, the slots then being suitably terminated at the ends where necessary to prevent a complete cutting out of the form from the flat strips or plates.

In another feature of the invention, the guides are each formed with a shaped depression in a desired contour such as an animal or a doll's body, correctly shaped slots are cut around the perimeter of the depression following the contour except for breaks therein for preventing the cutting out of the center of the guides and two pieces of textile material with a section of cotton or like batting or similar packing therebetween are placed between the two guides which are then fixed in aligned position.

In all cases, sewing with a conventional needle and thread can be performed through the slots using them to guide the sewer in a correct line whether straight or curved, acting to educate the uninitiated in the correct way to sew and removing much of the dangers in allowing a young child, for instance, to use a needle.

Reference will now be made to the accompanying drawings forming part of this specification and illustrating embodiments of the present invention.

Of the drawings:

Figure 7 is a plan view of a further embodiment of the educational sewing appliance according to the present invention;

Figure 8 is a cross-section of the appliance of Fig. 7 taken on the lines 8—8 of Fig. 7;

Figure 9 is a plan view of a further embodiment of the educational sewing appliance according to the present invention; and Figure 10 is a cross-section of the appliance of Fig. 9 on the lines 10—10 of Fig. 9.

Figure 1:
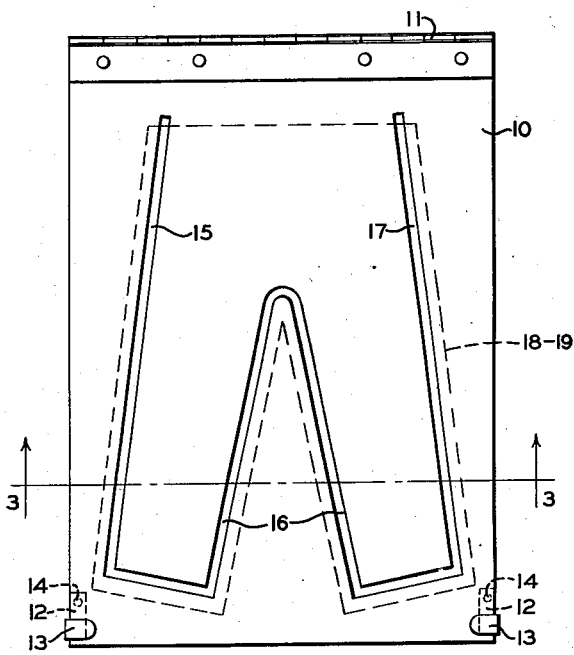
Figure 1 is a plan view of a typical educational sewing appliance according to the present invention.
Figure 2:
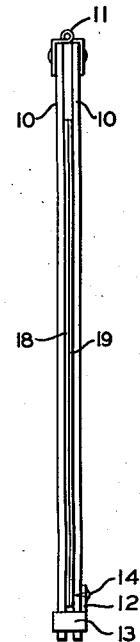
Figure 2 is a side view of the appliance of Fig. 1.
Figure 3:
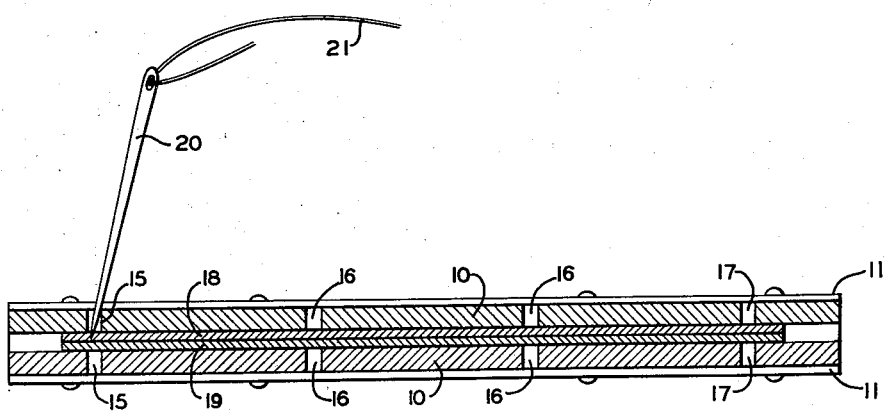
Figure 3 is a cross-sectional view of the appliance of Fig. 1 taken on the lines 3—3 of Fig. 1.

Referring now to Figs. 1 and 2, there is shown an educational appliance for teaching sewing comprising a pair of guides 10 hinged along one edge by a long hinge 11 and adapted to be maintained in closed position when this is desired by a pair of clips 12 having U-shaped grips 13 at their ends embracing both guides 10 within the U thereof when pivoted into the position shown in the drawings on pins 14 made fast upon one of guides 10. As is seen from Fig. 1, the contour utilized in this appliance is for pajama trousers and this contour is formed of slots 15, 16 and 17, slots 15 and 17 being straight but angularly located respecting each other and slot 16 being inverted V-shaped, therebetween. When the appliance is closed as illustrated, the slots 15, 16 and 17 formed alike in each guide 10 will be aligned. As best shown in Fig. 3, two pieces of textile fabric 18, 19 are superimposed and placed between the guides 10 which are then closed and locked in position by clips 12.

By means of slots 15, 16 and 17, the sewer can utilize the needle 20 with thread 21 to accurately sew the garment having the contour given by the slots, whereafter the two pieces of fabric 18 and 19 may be removed from the guides, the surplus cut off using the stitches as guides to provide a finished doll's garment.

Figure 5:
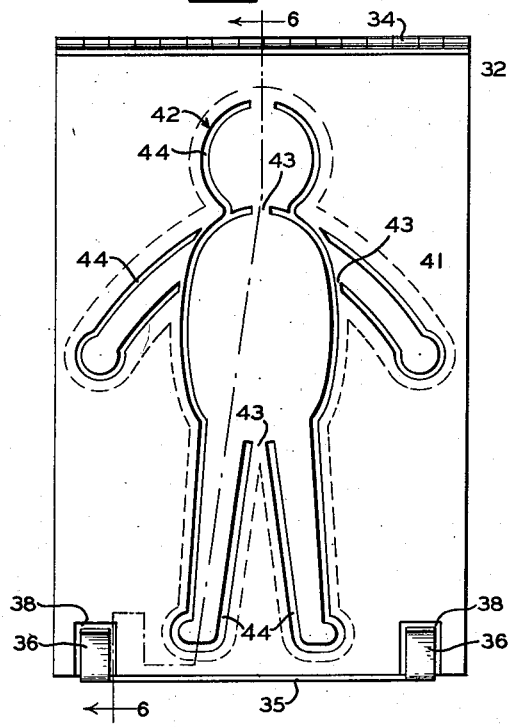
Figure 5 is a plan view of a modified form of the appliance of Fig. 4.
Figure 4:
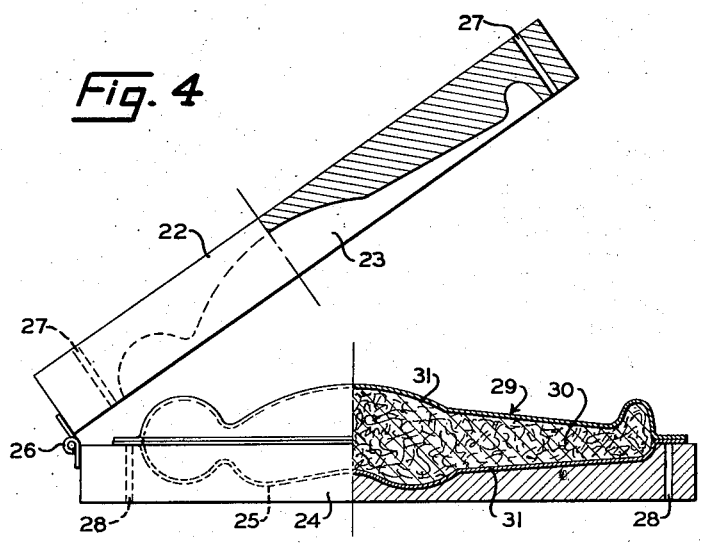
Figure 4 is a side elevation with parts in section with the sewing guides open for clarity of another embodiment of the educational sewing appliance according to the present invention.

A modification of the invention utilizing the same principles defined above is illustrated in Fig. 4 as applied to the making of a child's doll or like toy, the right-hand part being in section. The appliance comprises an upper member 22 having an inside contour 23 shaped to a form necessary to cooperate with a contour 25 in the lower member 24 to form a desired toy figure, in the illustrated case a doll. Members 22 and 24 are pivotally attached at one end by a hinge 26 of conventional form. Through the body of each member 22 and 24 are slots 27 and 28 which align when the two members are in closed position and through these slots a threaded needle can pass. The toy or doll 29 is formed of an inside padding or stuffing 30 which may be preformed to shape as shown in Fig. 4 and both under and over the padding 30 is placed a piece of textile or like material 31. Both pieces of material 31 are larger in area than the area of the padding 30 and, therefore, upon the two members being closed, sewing can be done through slots 27 and 28 which are formed to follow the plan contour of the doll 29 in a similar way to that shown in Fig. 1. Fig. 5 shows a view substantially equivalent to the plan view of Fig. 4. The device of Fig. 4 may not of necessity need any clip or other means for locking members 22 and 24 together since the weight of the members may be sufficient to hold them in place and the deep contours or shaped depressions 23 and 25 will hold the padding 30 and pieces of fabric 31 in place during sewing but if desired, a clip similar to clip 12 of Fig. 1 may be provided for securing the two members in place.

Figure 6:
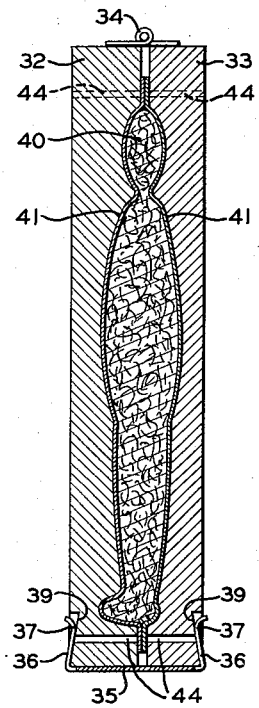
Figure 6 is a cross-section of the appliance of Fig. 5 on the lines 6—6 of Fig. 5.

Figs. 5 and 6 illustrate a modification of the invention similar to that of Fig. 4 but altered in slight details. The two members 32 and 33 have contours therein similar to contours 23, 25 of Fig. 4 and are hinged together by a hinge 34 and can be held tightly in contact by a clip 35. Clip 35 is made of resilient material such as spring steel and is substantially U-shaped at each end forming grippers 36. The distance between the prongs 37 of grippers 36 at each end is less than the thickness of the two members 32, 33 and at the lower end of each member 32, 33 there are arranged depressions 38 into which said prongs 37 can fit as shown in Figs. 5 and 6, the prongs being forced outwardly due to the angular face 39 of each depression. Thus, when clips 35 are forced into place, the two members 32, 33 are pressed tightly together and locked. To make a toy such as the doll illustrated a piece of flat batting or other padding 40 of suitable thickness is placed between two pieces of textile 41, the area of the padding and textile pieces being greater than that of the contour 42 of the doll. The two members 32 and 33 are now closed and locked by clip 35 thus forcing the textile pieces 41 and padding 40 into the shape determined by the contours on the inner faces of the members 32, 33, as clearly shown in Fig. 6. The contour 42 shown in Fig. 5 follows the plan view of the doll except for islands 43 to prevent the cutting out of the area. This contour is formed by slots 44 of suitable width for the introduction and guiding of a needle whereby the outline of the doll can be sewed, after which excess padding and fabric can be cut away as previously explained. The padding 40 will, of course, preserve the shape given to it by the contours of the inner faces of members 32, 33 by virtue of the stitches sewn through the slots 44.

It is obvious that the textile fabric together with padding when used for any of the above modifications can be pre-cut to a shape equivalent to that of the contour of the slots and of slightly larger area to that of the contour of the slots, thus eliminating the cutting using the stitches as the guide, since such cutting may be beyond the skill of a child making such a doll or a garment therefor.

Fig. 8 illustrates a further modification of the present invention utilizing the same principle to cause sewing of a straight line, for instance, for a patchwork quilt for use with a doll or for sewing a hem. Two guides 45 are hinged together along one edge by a hinge 46 and each guide 45 has a long, continuous slot 47 at its edge near said hinge. The guides can be long and narrow in this case as illustrated. Two pieces of fabric 48, for instance cut square for a patchwork quilt, are superimposed and then placed between the two guides with their upper edges aligned by the inside face of hinge 46. Now a line can be sewn through the aligned slots 46 to attach an edge of the pieces of fabric which can then be turned for sewing another edge and attaching another square, until a large quilt has been made.

If desired, a suitable clip to hold guides 45 together can be provided of either form hereinbefore described.

All of the modifications above described can be provided together, if desired, as a kit for educational and pastime purposes whereby a doll for example as shown in Fig. 4 or 5 may be made, and thereafter the doll's clothes can be made, for example as shown in Fig. 1, together with quilts or the like for the doll's bed, as shown for example in Fig. 7.

Any form or contour can be given to the slots 15 and 17 of Fig. 1 while any contour can be given to the shaped portions 23 and 25 of Fig. 4 to provide educational toys of any type and arrangement such as dolls, animals, articles of clothing for these and the like.

The material utilized for the various forms of the sewing appliance can be transparent such as a plastic material or opaque such as cardboard and the hinging of the two members of the appliance can be permanent such as a metal or like hinge or temporary such as by using gummed tape or the two parts may be superposed and held with the slots in register in any known way.

Figures 9 and 10 show a further modification of the present invention similar to Fig. 8 and utilizing the same principle to sewing, for instance, a straight line, where one of the slots or group thereof are formed as a complete cut-out of one member.

In Figs. 9 and 10, the two members 50 and 51 are hinged at 52. Member 50 has a slot 53 therein similar for instance to slots 47 in Fig. 8, but member 51 has instead of a slot a cut away portion 54 the inner edge of which coincides with the lower edge of slot 53, thus forming a suitable guide for the needle as hereinbefore brought forth. The advantage of cutting away the material as at 54 is to permit the sewer to see the edge of the material being sewn and to align same in the guide. Obviously, the principle shown in Figs. 9 and 10 could be applied to any of the appliances of Figs. 1 to 7, if desired.

It is obvious that many modifications can be made within the scope of the claims hereinafter presented and in accordance with the present invention.

What I claim is:

1. An educational appliance for teaching sewing and making of dolls and the like comprising in combination; a pair of members swingingly attached together at one edge each having a contoured depression on its inner face shaped to cooperate with the depression in the other member to form a desired shape of doll; a locking means at another edge of the members to forcefully hold them in superposed position when closed with material for forming the doll therebetween said clip being a spring clip formed to fit into tapered grooves in the outer faces of said members to press the members toward each other and compress said material into said contoured depressions, and slots through said members fomed in a contour outlining at least in part the shape of said doll said slots being aligned and in register when said members are in said closed superposed position.

2. An educational appliance for teaching sewing and making of dolls and the like comprising in combination a pair of members swingingly attached together at one edge each having a contoured depression on its inner face shaped to cooperate with the depression in the other member to form a desired shape of doll; and slots through said members formed in a contour outlining at least in part the shape of said doll said slots being aligned and in register when said members are in closed superposed position.

3. An educational appliance for teaching sewing and making of dolls and the like comprising in combination a pair of members swingingly attached together at one edge each having a contoured depression on its inner face shaped to cooperate with the depression in the other member to form a desired shape of doll; a locking means at another edge of the members to hold them in superposed position when closed with material for forming the doll therebetween, and slots through said members formed in a contour outlining at least in part the shape of said doll said slots being aligned and in register when said members are in closed superposed position.

HARRY A. ROSEN.

REFERENCES CITED

The following references are of record in the file of this patent:

UNITED STATES PATENTS

| Number | Name | Date |
| --- | --- | --- |
| 689,354 | Colton | Dec. 17, 1901 |
| 970,586 | Whitaker | Sept. 20, 1910 |
| 1,092,038 | Gerber | Mar. 31, 1914 |
| 1,421,975 | Meyers | July 4, 1922 |
| 1,850,115 | McCarthy | Mar. 22, 1932 |
| 2,454,632 | Cohn | Nov. 23, 1948 |